United States Patent
George

(10) Patent No.: US 12,424,121 B2
(45) Date of Patent: Sep. 23, 2025

(54) MUSIC CHORD MAP

(71) Applicant: Michael George, Draper, UT (US)

(72) Inventor: Michael George, Draper, UT (US)

(*) Notice: Subject to any disclaimer, the term of this patent is extended or adjusted under 35 U.S.C. 154(b) by 230 days.

(21) Appl. No.: 18/381,704

(22) Filed: Oct. 19, 2023

(65) Prior Publication Data

US 2024/0395164 A1    Nov. 28, 2024

Related U.S. Application Data

(60) Provisional application No. 63/469,340, filed on May 26, 2023.

(51) Int. Cl.
*G09B 15/00*    (2006.01)

(52) U.S. Cl.
CPC .................................. *G09B 15/007* (2013.01)

(58) Field of Classification Search
CPC .. G09B 15/007; G09B 15/001; G09B 15/002; G09B 15/0004; G09B 15/008
See application file for complete search history.

(56) References Cited

U.S. PATENT DOCUMENTS

| | | | | |
|---|---|---|---|---|
| 3,960,046 A * | 6/1976 | Choong | ............... | G09B 15/007 84/474 |
| D535,333 S * | 1/2007 | Ellis | .............................. | D19/64 |
| 9,076,346 B2 * | 7/2015 | Quattrocchi | ......... | G09B 15/002 |
| 2011/0167987 A1 * | 7/2011 | Lozano, Jr. | ............ | G09B 15/02 84/471 R |
| 2022/0108672 A1 * | 4/2022 | Collings | .............. | G09B 15/023 |

FOREIGN PATENT DOCUMENTS

FR           2778005 A3 * 10/1999    ............... G10G 1/04

* cited by examiner

*Primary Examiner* — Erin Kryukova
(74) *Attorney, Agent, or Firm* — Shapiro IP Law; Joseph Shapiro

(57) ABSTRACT

A Chord Map comprises three circular, independently rotatable, concentrically aligned layers of music information: chord array, mode numerals, and grouping. The chord array layer comprises an inner ring (12 major chords), a middle ring (12 minor chords), and an outer ring (12 diminished chords). Text, color, and shape are used to identify the chords, harmonic relationships, and intervallic distances. Spatial organization illustrates chord relationships. The mode numerals layer comprises an inner ring, a middle ring, and an outer ring—each comprising 12 symbols to identify major chords, minor chords, and diminished chords. Sharp and flat symbols further distinguish chords in relation to a given tonic. The mode numerals layer may additionally comprise seven mode labels. The grouping layer comprises an outline to group chords and symbols in the other two layers. The mode numerals layer and grouping layer are transparent so that the information in the chord array layer is visible.

20 Claims, 19 Drawing Sheets

MUSIC CHORD MAP

CROSS REFERENCE TO RELATED APPLICATIONS

This application claims priority to U.S. Provisional Application No. 63/469,340, filed on May 26, 2023, titled "Music Chord Map," and the first inventor of which is Michael George.

BACKGROUND OF THE INVENTION

Music theory is difficult. Mastery usually requires years of committed study, use, and experimentation. Chord theory, or the study of harmony—which is one of the fundamentals of music theory—is no exception. Although many teachers, books, and other media teach the same basic concepts, not all teaching methods are equal.

In chord theory, the circle of fifths is a well-known way of organizing the twelve chromatic pitches as a sequence of perfect fifths. Although the circle of fifths is a widely used and useful visual/spatial representation of the twelve chromatic pitches for teaching, studying, and reference, it has not heretofore been fully utilized in a practical way to clearly illustrate the many relationships between musical chords.

What is needed is an improved apparatus for depicting the cyclical, symmetrical connections between the harmonies of all 12 keys as well as the adjacent links between the parallel modes of those keys—all in a single, streamlined interface.

BRIEF SUMMARY OF THE INVENTION

A Chord Map may comprise three circular concentrically aligned layers of music information, configured to be rotated relative to each other. The three layers may be a chord array layer, mode numerals layer, and grouping layer. The chord array layer may comprise, concentrically aligned, an inner ring (12 major chords), a middle ring (12 minor chords), and an outer ring (12 diminished chords). Each chord representation may comprise a textual chord identifier, a color, and a shape. The color and shape are visual cues to illustrate the harmonic relationships between chord roots within the circle of fifths, as well as the intervallic distance between those notes. The spatial organization of the chords in the chord array layer illustrates chord relationships.

The mode numerals layer may comprise, concentrically aligned, an inner ring, a middle ring, and an outer ring—each comprising 12 symbols to identify major chords (capital numerals), minor chords (lowercase numerals), and diminished chords (lowercase numerals with a "o" superscript). Additional sharp (#) and flat (b) symbols further distinguish chords in relation to a given tonic. The mode numerals layer may additionally comprise seven mode labels: "Lydian," "Ionian," "Mixolydian," "Dorian," "Aeolian," "Phrygian," and "Locrian." Except for the symbols, the mode numerals layer may be transparent so that, when overlaid over the chord array layer, the chord representations in the chord array layer are visible through the mode numerals layer.

The grouping layer may comprise an outline that, when overlaid over the chord array layer and the mode numerals layer, associates/groups multiple chords from the chord array layer and multiple symbols from the mode numerals layer.

DETAILED DESCRIPTION OF THE INVENTION

An apparatus for music theory teaching and reference is disclosed. As used herein below, this apparatus may be referred to as a "Chord Map."

Table of Reference Numbers from Drawings:
The following table is for convenience only and should not be construed to supersede any potentially inconsistent disclosure herein.

| Reference Number | Description |
| --- | --- |
| 100 | ChordMap |
| 105 | axis |
| 110 | chord array layer |
| 115 | inner ring |
| 115a-1 | inner ring chord symbols |
| 120 | middle ring |
| 120a-1 | middle ring chord symbols |
| 125 | outer ring |
| 125a-1 | outer ring chord symbols |
| 140 | mode numerals layer |
| 145 | inner ring |
| 145a-1 | inner ring symbols |
| 150 | middle ring |
| 150a-1 | middle ring symbols |
| 155 | outer ring |
| 155a-1 | outer ring symbols |
| 161 | mode label |
| 162 | mode label |
| 163 | mode label |
| 164 | mode label |
| 165 | mode label |
| 166 | mode label |
| 167 | mode label |
| 170 | grouping layer |
| 180 | grouping indication |

The Chord Map disclosed herein represents all chords displayed as concentrically radiating rings of harmonies, such as major, minor, and diminished chords, with these rings aligned to form musical key groupings. To further illustrate chordal relationships, multiple overlays are provided, including a separate layer of numbers/numerals representing harmonic functions or positions within a given key and mode, markings that highlight the relative positions of musical modes to aid the use of borrowed chords and modal mixture, and a separate layer with additional markings that visually clarify chord groupings within the circle of fifths.

Together, these layers present a dynamic, interactive tool that allows the user to explore and understand harmony for song analysis and composition.

Figure 5:
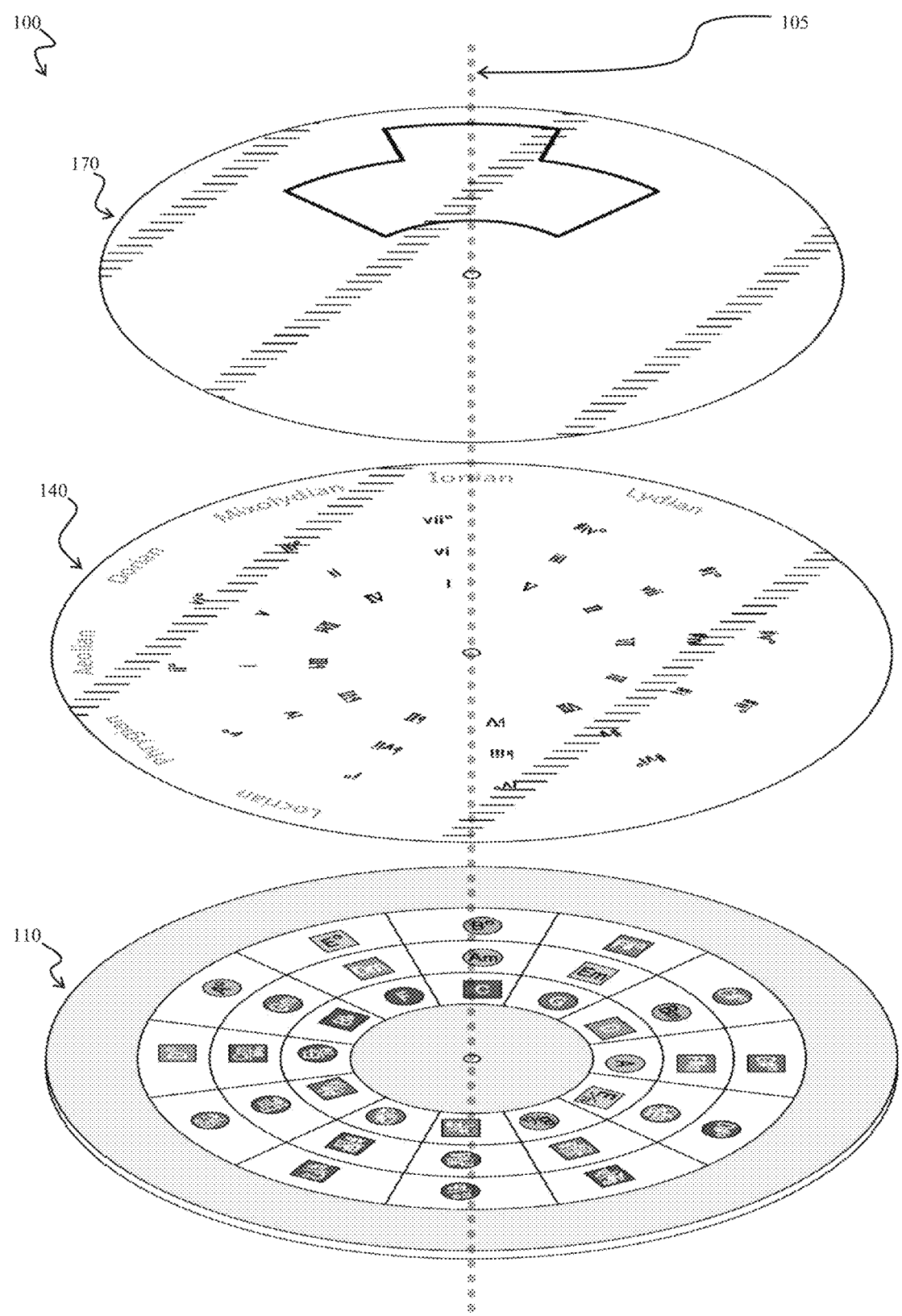
FIG. 5 shows an exploded view of an exemplary Chord Map.
Figure 6:
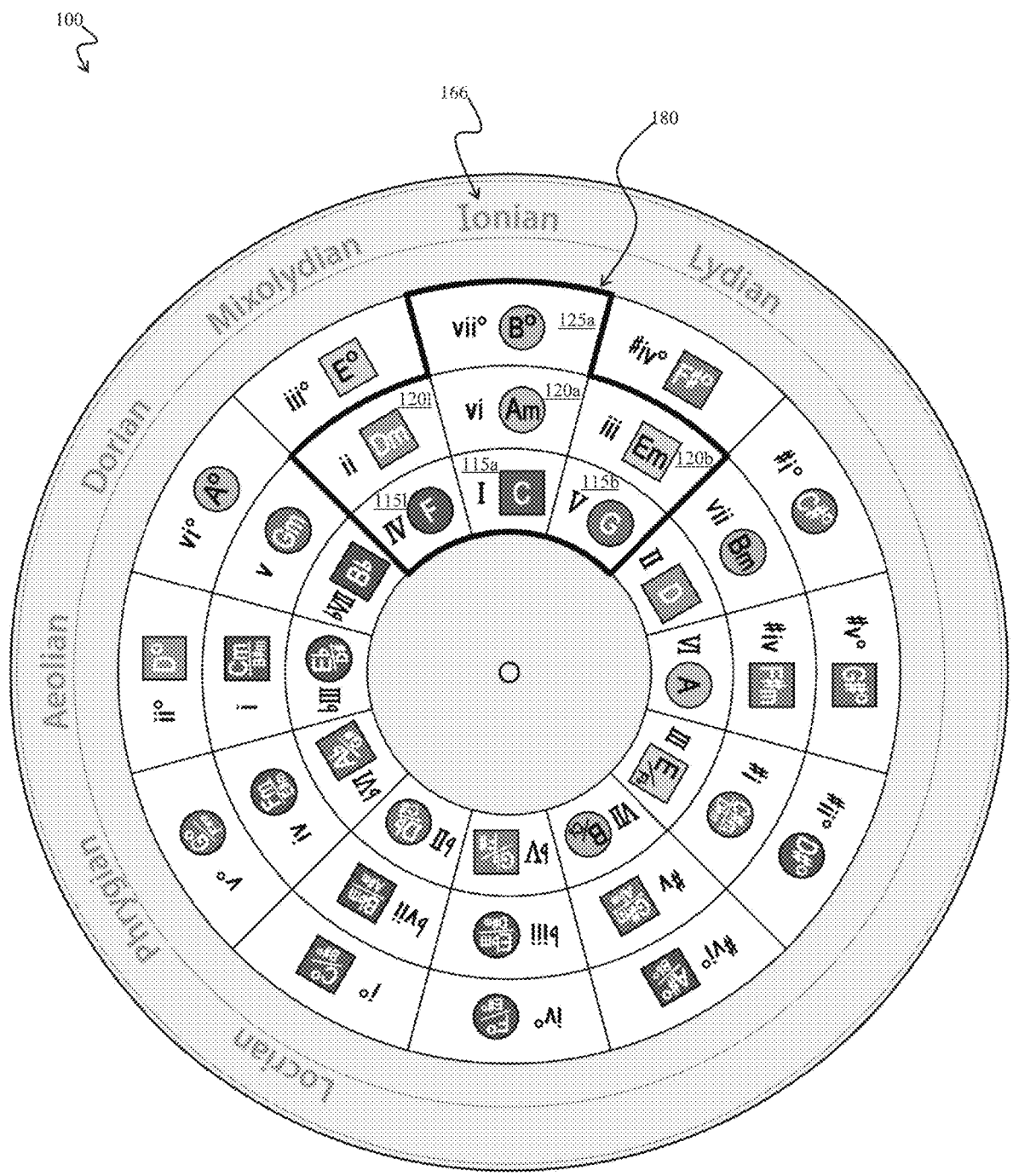
FIG. 6 shows an exemplary Chord Map configuration.

As shown in FIGS. 5 and 6, an exemplary Chord Map 100 may comprise three concentrically aligned two-dimensional representations of music information. In one embodiment, each of these three two-dimensional representations of information may be a circle, and may be designed, configured, and dimensioned to be rotated independent of each other along the same axis (virtual or actual) running through the center of each circle and perpendicular to the two-dimensional circles.

Figure 4:
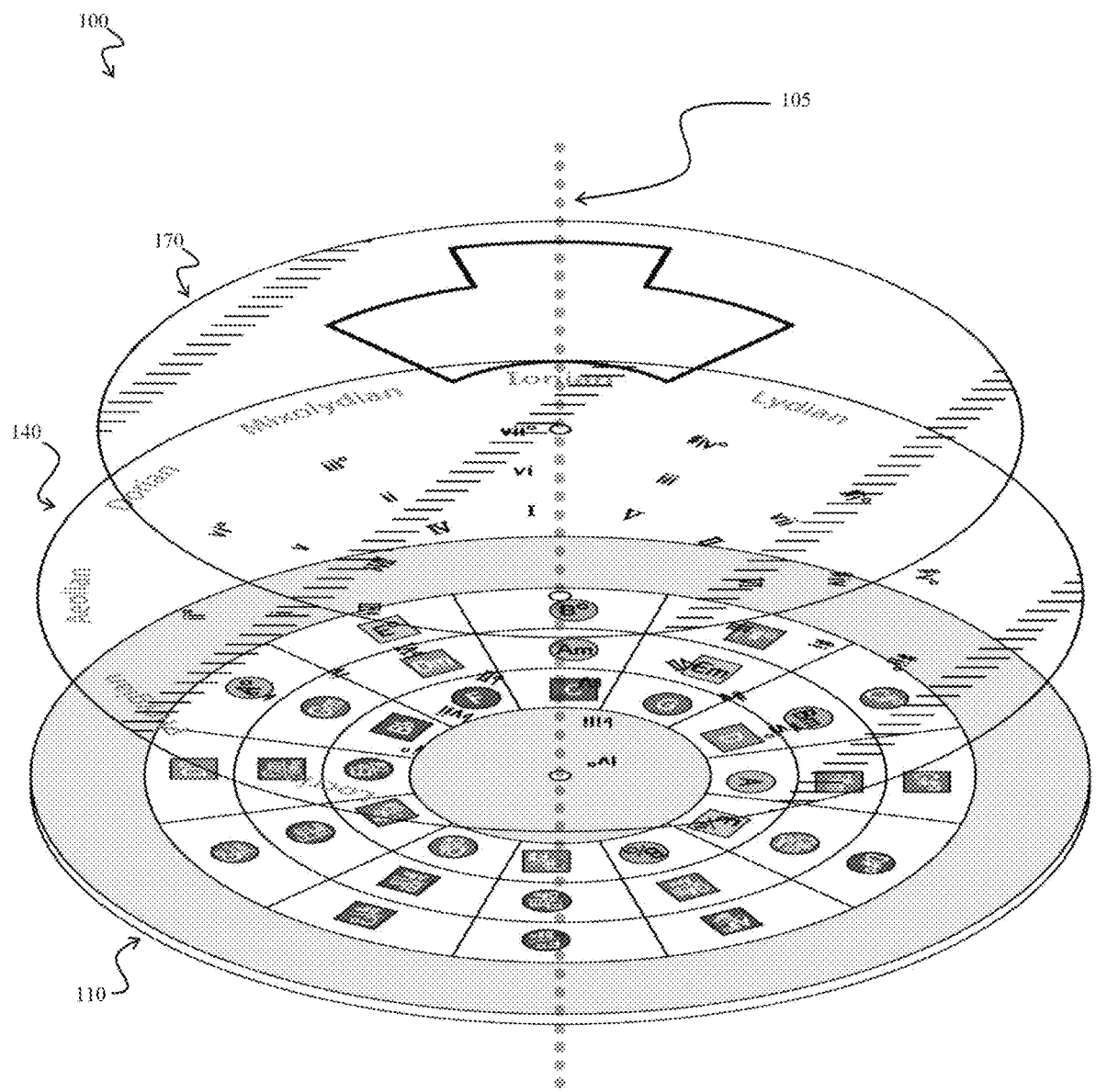
FIG. 4 shows an exploded view of an exemplary Chord Map.

As shown in FIGS. 4 and 5, a Chord Map 100 may comprise chord array layer 110, mode numerals layer 140, and grouping layer 170.

Chord Array Layer

Figure 1:
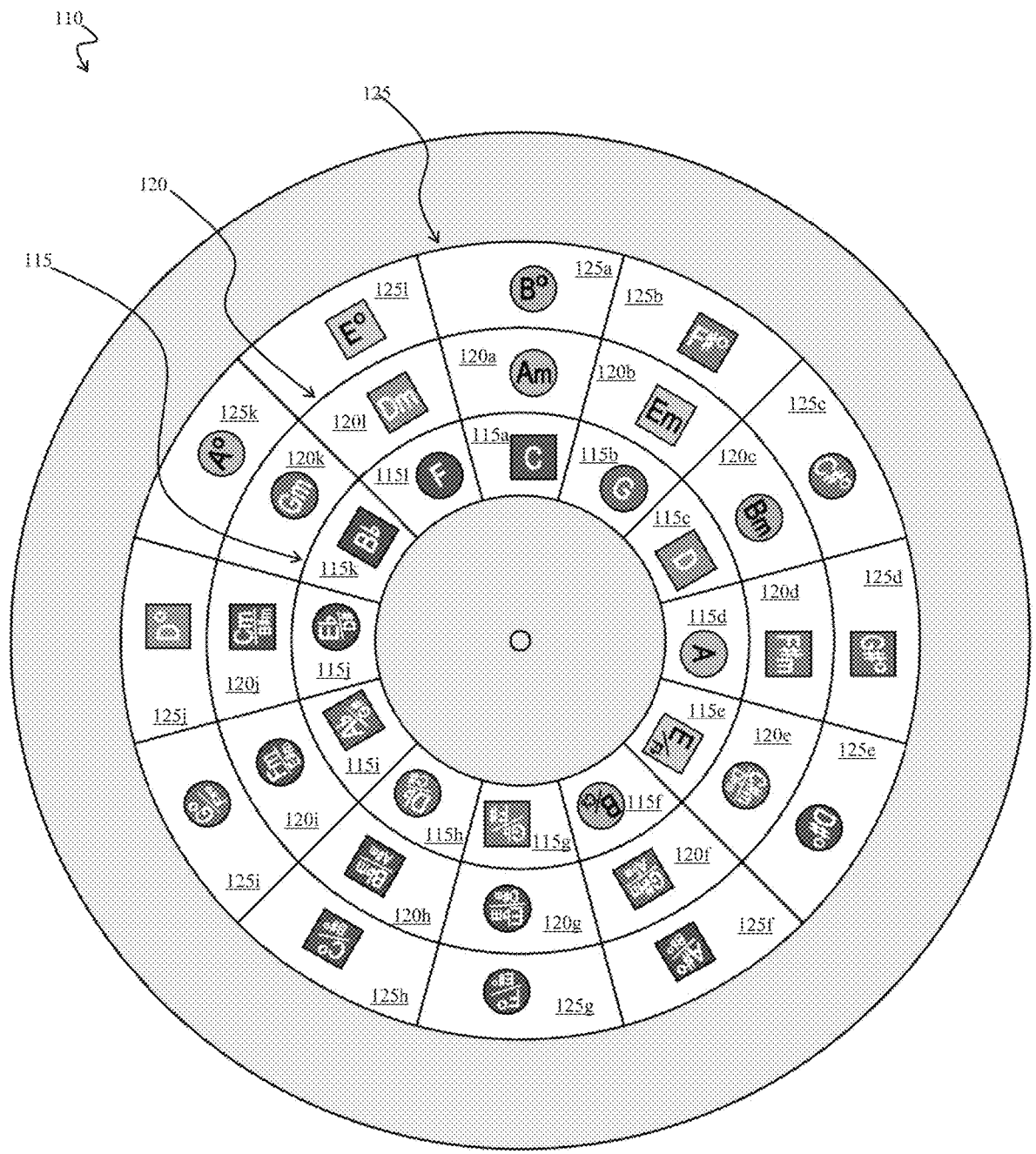
FIG. 1 shows an exemplary chord array layer.

As shown in FIG. 1, chord array layer 110 comprises three concentric rings: inner ring 115, middle ring 120, and outer ring 125. Each ring 115, 120, and 125, comprises twelve coded chord representations 115*a*-1, 120*a*-1, and 125*a*-1, respectively. Inner ring 115 is major chords. Middle ring 120 is minor chords. Outer ring 125 is diminished chords.

In one embodiment, each chord representation 115*a*-1, 120*a*-1, and 125*a*-1 may comprise three pieces of information: a textual chord reference, a color, and a shape. The color and shape are codes (visual cues) used to illustrate the harmonic relationships between chord roots within the circle of fifths, as well as the intervallic distance between those notes.

The spatial organization of chords 115*a*-1, 120*a*-1, and 125*a*-1 in chord array layer 110 illustrate chord relationships within all keys and modes, thereby providing a streamlined structure that illustrates all relative and parallel modes simultaneously.

For example, as shown in FIG. 6, chord array layer 110, mode numerals layer 140, and grouping layer 170 are aligned to highlight chords within C Ionian (also known as the key of C major). Grouping indication 180 groups the seven chords (from chord array layer 110) in this mode, including C major (115*a*), D minor (1201), E minor (120*b*), F major (1151), G major (115*b*), A minor (120*a*), and B diminished (125*a*), while the numerals (from mode numerals layer 140) mark the position of each harmony—namely, I, ii, iii, IV, V, vi, and vii°, respectively. Mode label 162 displays the musical name of this grouping (Ionian).

Figure 7:
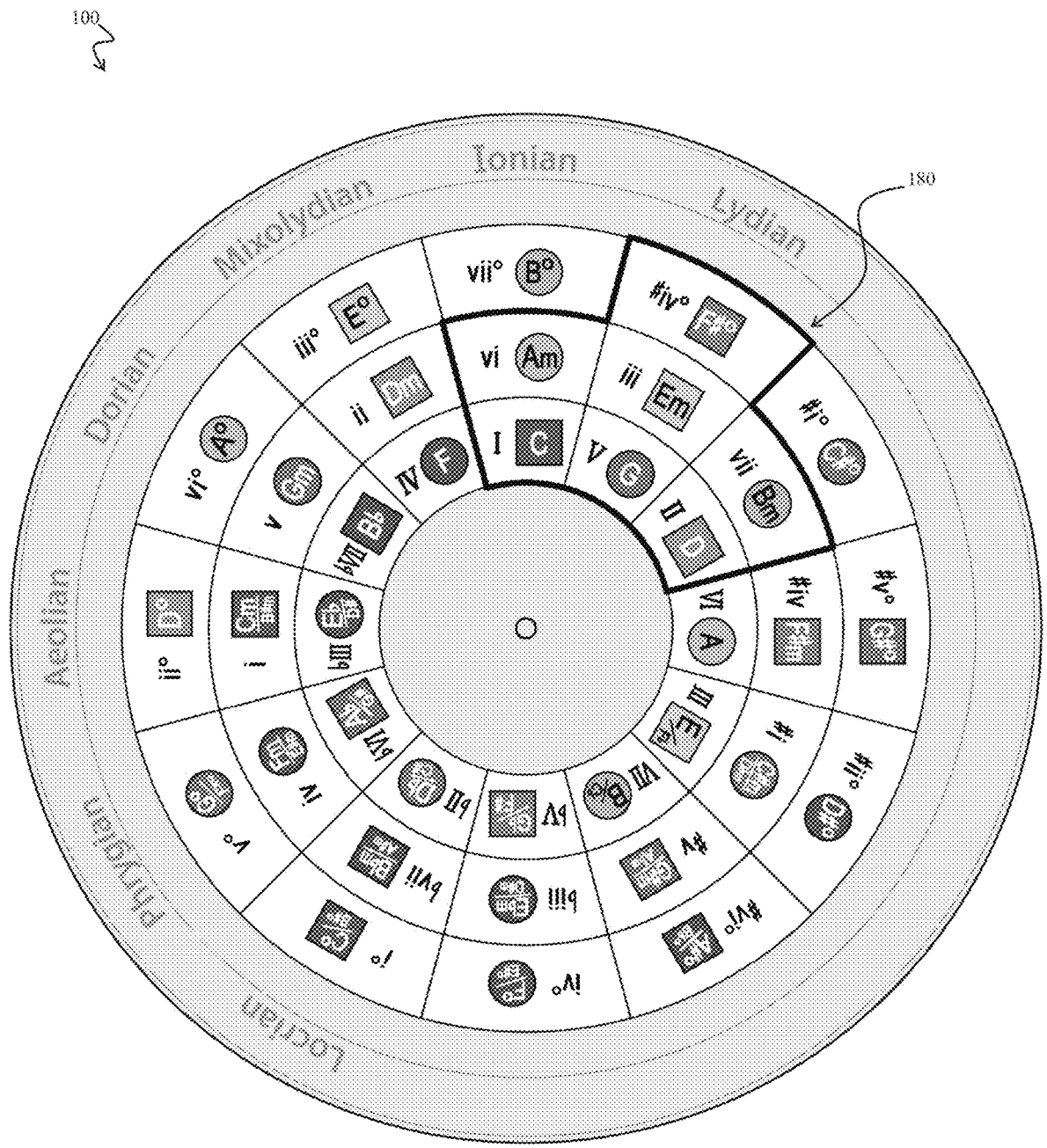
FIG. 7 shows an exemplary Chord Map configuration.
Figure 8:
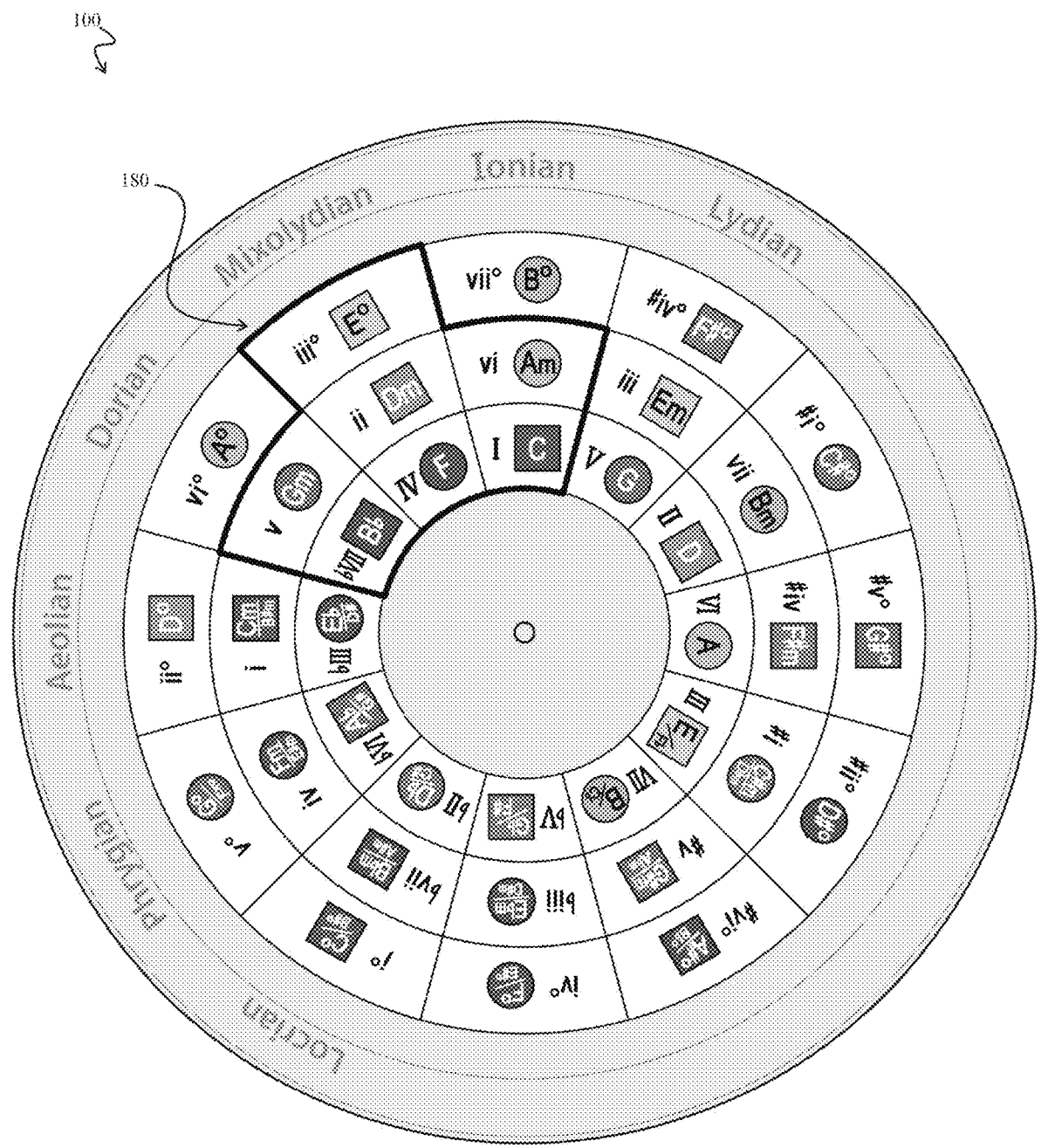
FIG. 8 shows an exemplary Chord Map configuration.
Figure 9:
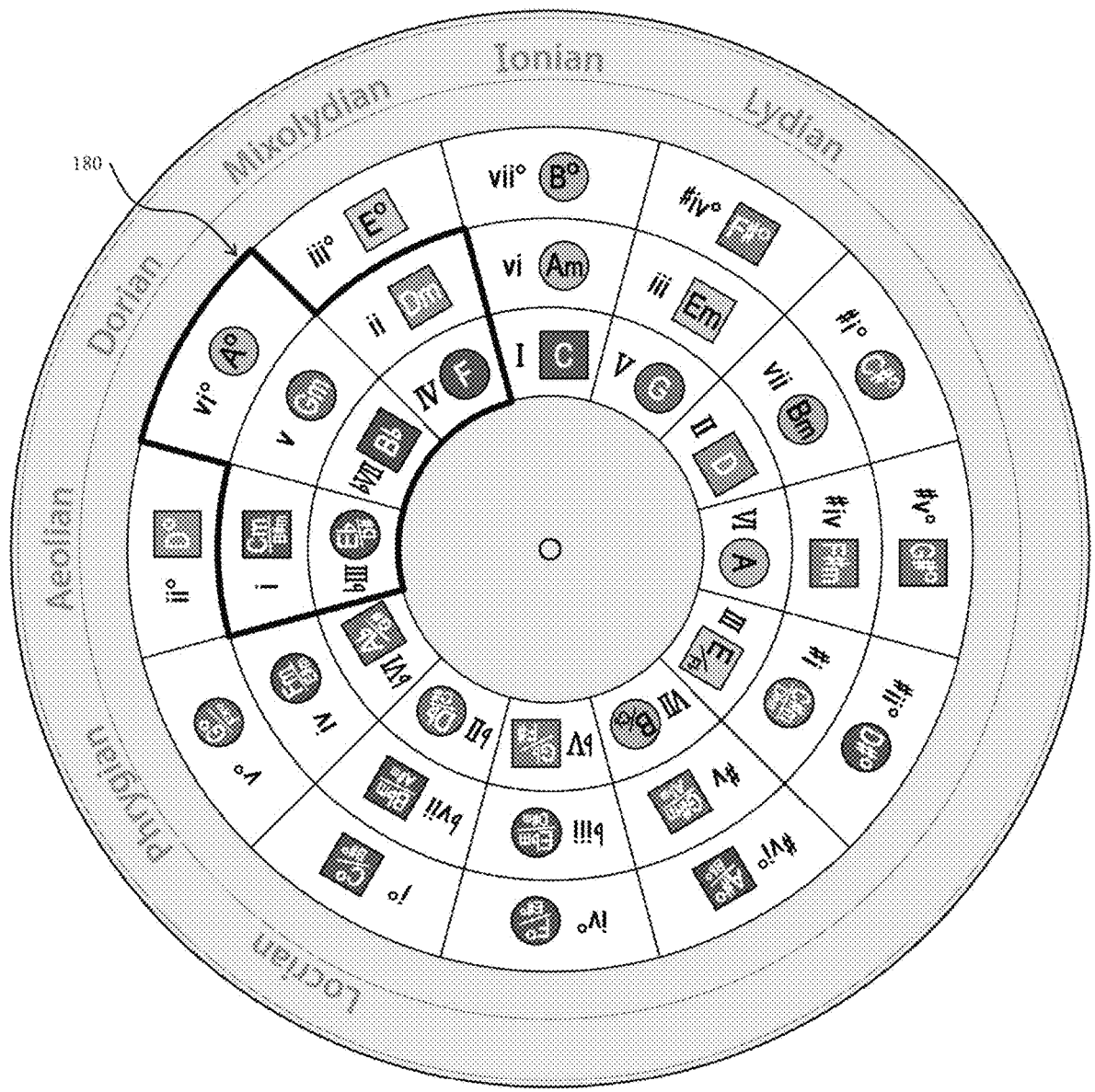
FIG. 9 shows an exemplary Chord Map configuration.

Because each of layers 110, 140, and 170 can be rotated independently, the user can study various other relationships between the chords on the Chord Map. For example, as shown in FIG. 7, grouping layer 170 can be rotated 30-degrees in a clockwise direction so that grouping indication 180 surrounds the chords within the C Lydian mode, where the mode numerals layer 140 continues to show the chordal relationships in this parallel mode. Or, as shown in FIGS. 8-12, grouping layer 170 can be rotated in 30-degree increments in a counterclockwise direction to highlight the various other C parallel modes (such as C Mixolydian, C Dorian, C Aeolian, C Phrygian, and C Locrian). Again, the mode numerals overlay (layer 140) consistently illustrates the respective position and function of the chords in each instance.

Figure 16:
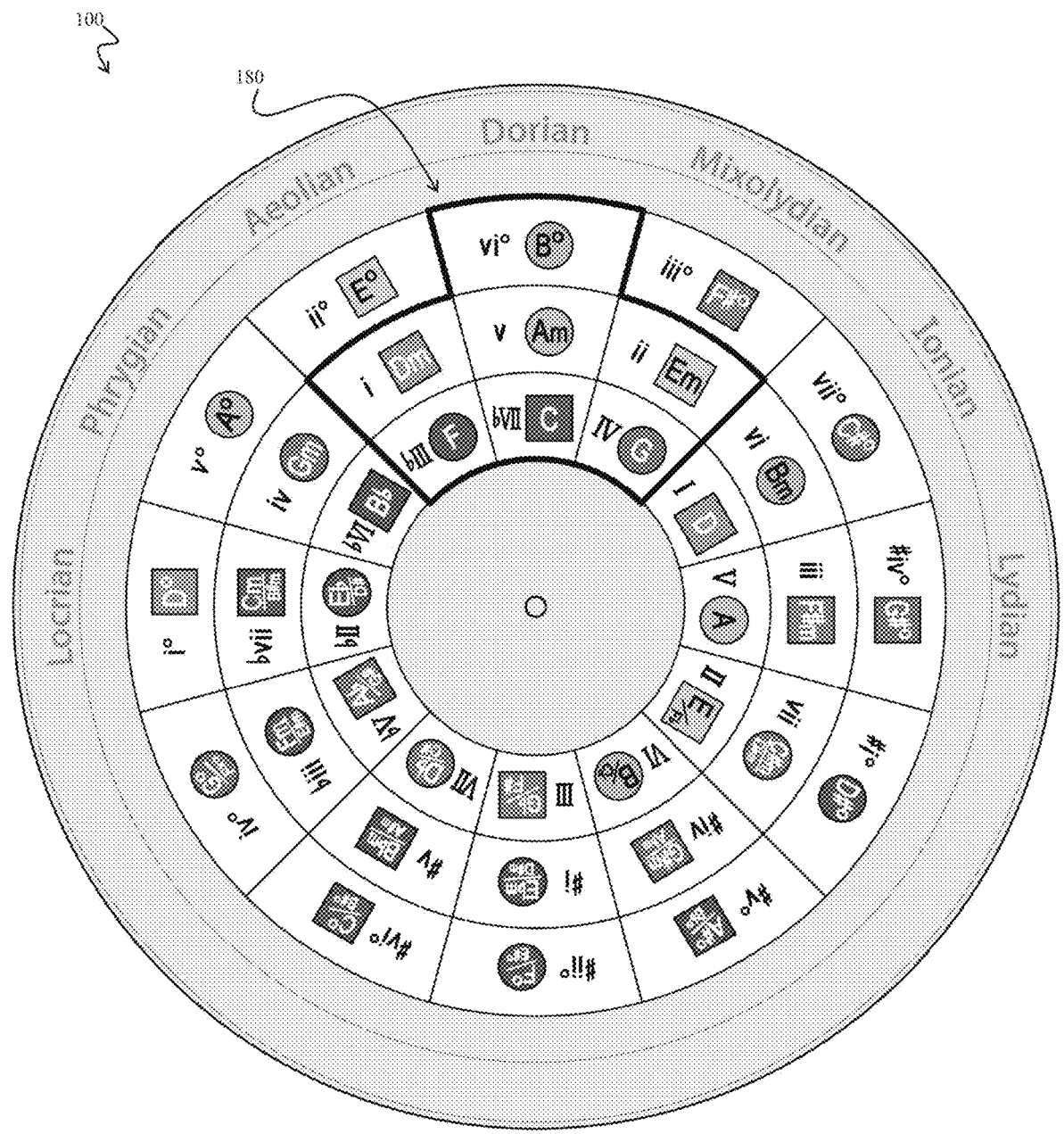
FIG. 16 shows an exemplary Chord Map configuration.

Because each of layers 110, 140, and 170 can be rotated independently, these same relationships can be studied within all 12 keys. To demonstrate, if the user returns grouping layer 170 to the first position in the example above (FIG. 6), encircling/grouping the chords of C major (115*a*), D minor (1201), E minor (120*b*), F major (1151), G major (115*b*), A minor (120*a*), and B diminished (125*a*), but instead rotates the mode numerals layer 140 clockwise by 60 degrees, the respective layers are aligned to highlight the chords of the D Dorian mode (FIG. 16), illuminating the fact that D Dorian and C Ionian are permutations of the same chord grouping. Likewise, these same cyclical and symmetrical relationships are illustrated throughout Chord Map 100. By illustrating chord relationships in this way, the Chord Map allows the user to quickly navigate the circle of fifths, identifying musical relationships to analyze chord progressions, including the use of borrowed chords from parallel modes in any key, modal mixture in compositions (clarifying from where the chords in a song that are outside of the "home" key are derived), and modulation (shifting between keys within a composition).

As shown in FIG. 1, each chord 115*a*-1, 120*a*-1, and 125*a*-1 in chord array layer 110 is represented by its root note, with the respective colors highlighting the relationships between harmonies as they are arranged in the circle of fifths formation. For example, C major (115*a*) is red, which is next to G major (115*b*) (red-orange), which is next to D major (115*c*) (orange), etc. This correlation between notes/chords and colors of the color wheel reinforces the connections between musical keys, as they are formed in the circle of fifths. In music, each major scale is formed by two tetrachords, wherein each tetrachord is shared by two keys, resulting in an overlapping daisy-chain of tetrachords that links all major scales into a single, cyclical pattern. This pattern is known as the circle of fifths, where each new scale (key) begins on the fifth note of the previous scale. The color-note correlation illustrates this connection—that, just as all keys overlap in the circle of fifths sequence, all colors bleed seamlessly into one another in a cyclical pattern. Within layer 110 of Chord Map 100, each concentric ring of chords (e.g., major chords 115*a*-1 in inner ring 115, minor chords 120*a*-1 in middle ring 120, and diminished chords 125*a*-1 in outer ring 125) highlights these relationships between chords. For example, the C major (115*a*), C minor (120*j*), and C diminished (125*h*) chords are all depicted by the color red based on the root note shared by these harmonies. Likewise, the G major (115*b*), G minor (120*k*), and G diminished (125*i*) chords are shown as red-orange to highlight their shared root note. These colors illuminate the connections between chords that share the same root note, as well as the relationships between all other chords in the circle of fifths. This is because the color of each respective chord represents the underlying note patterns that form the tertian harmonies in a given key and mode. This color-note/chord relationship is consistent in every position on layer 110 of Chord Map 100, reinforcing its ability to accurately illuminate chord connections within every key and mode in the circle of fifths, providing the user with a streamlined and intuitive view of music theory for songwriting.

So, to elaborate, the colors help to illustrate musical relationships more immediately and intuitively than the terms and symbols traditionally used in music. For example, it is more readily apparent that chords C (115*a*), G (115*b*), and D (115*c*) are related when shown as red, red-orange, and orange than by their letter names alone. Because letter symbols are not inherently cyclical (as are both color and music) and these characters are borrowed from language systems used to spell words, it is not obvious to the uninitiated that any connection exists between letters C, G, and D. Such an understanding would require a deeper pre-existing knowledge of musical concepts. In contrast, the colors visually convey that these chords are related without the need for prior expertise, greatly enhancing the learning process and streamlining the user's experience.

The examples provided herein show how colors highlight the connections between adjacent chords in the circle of fifths (e.g. C-G-D), and additionally how they illuminate the relationships between all chords. This is due to the further correlation between the symmetrical, geometric connections of color with the same symmetrical, geometric relationships that also exist between notes/chords in music (e.g., intervals of major-thirds, flatted-sevenths, tritones, etc.). The two systems—color and music—share analogous relationships, which Chord Map 100 illustrates for the purpose of aiding the user's understanding of music theory for songwriting.

The shapes in chord array layer 110 used to represent each chord highlight the intervals between notes in music and the chords that are built from those intervals (e.g., half-steps, whole-steps, as well as all scale degrees that arise from them, such as minor-seconds, major-seconds, minor-thirds, major-thirds, perfect fourths, perfect fifths, minor-sixths, major-sixths, minor-sevenths, and major-sevenths, and all other the variations of these simple intervals including compound intervals). To explain, the 12 notes of the chromatic scale are separated by a series of intervals called half-steps (a.k.a., semitones). On a piano keyboard, for example, these 12 half-steps include all of the black and white notes of a given octave. But while traditional methods of picturing/naming musical intervals reinforce an apparent distinction between natural notes (white keys) and accidentals (a.k.a., sharps/flats) (black keys)—resulting in a conventional understanding of music as asymmetrical, as depicted by circle-of-fifths diagrams representing musical keys as key signatures using various sharps and flats—music is, in fact, inherently symmetrical and geometric. And these geometric relationships between notes and intervals are illuminated using the alternating shapes shown on Chord Map 100, which further reinforce the geometry of the colors.

For example, referring to C Ionian (where C is the tonic, I), the shapes that represent each major chord are symmetrical on either side. To the left, F is a circle indicating the root of that chord (F, interval 4) is a perfect-fourth from the tonic (C, 1) in the chromatic scale. Likewise, G to the right is also a circle, showing the root of that chord (G, interval 5) is a perfect fifth from the tonic (C, 1). In the same way, Bb major further to the left is a square, indicating the root of that chord (Bb, interval b7) is a flat-seventh from C (1), while D major to the right is also a square because its root (D, interval 2) is a major-second from C (1). Continuing in both clockwise and counterclockwise directions, these alternating circles and squares reveal the underlying intervals between the root notes of the various chords in relation to one another and any given tonic in the circle of fifths. These shapes, in turn, also reveal the modal relationships between chords, including the underlying interval patterns used to form each mode in every key, as well as the symmetry between both parallel and relative modes in music.

Other coding schemes could be used including the depiction of chords using guitar chord diagrams (both right- and left-handed finger charts), piano diagrams, ukulele diagrams, triad inversions, etc.). The fundamental utility of Chord Map 100 is consistent, however, revealing the harmonic relationships between chords in all keys and modes simultaneously to facilitate musical analysis and composition.

Inner ring 115, middle ring 120, and outer ring 125 could be switched and the essential utility would remain. For example, the entire order could be inverted so that the diminished chords are positioned in the inner ring, with the minor chords in the middle ring, and the major chords in the outer ring. The numerals would also need to be repositioned accordingly, and the grouping line overlay shape would change (be flipped upside-down). Hypothetically, the concentric rings could be rearranged so that the minor chords are not in the middle ring, but this would result in a less intuitive layout because the relative major and minor chords would no longer be adjacent, creating more visual complication than may be ideal.

Mode Numerals Layer

Figure 2:
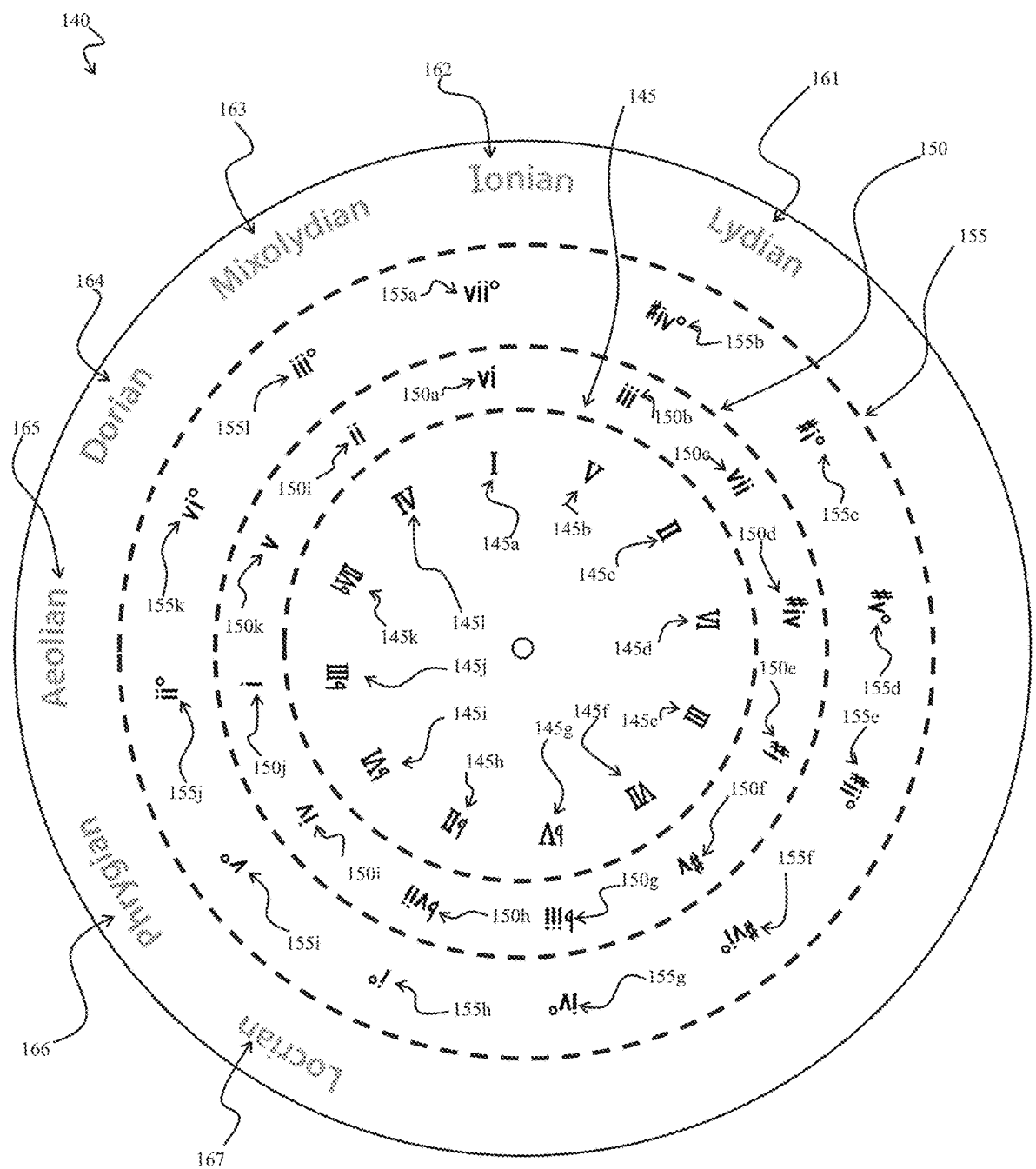
FIG. 2 shows an exemplary mode numerals layer.

As shown in FIG. 2, mode numerals layer 140 may comprise three concentric rings: inner ring 145, middle ring 150, and outer ring 155. Each ring 145, 150, and 155 comprises twelve symbols 145a-1, 150a-1, and 155a-1, respectively. Capital numerals represent major chords, lower-case numerals represent minor chords, and lower-case numerals with a "o" symbol represent diminished chords. Additional sharp (#) and flat (b) symbols further distinguish chords in relation to a given tonic (1). As also shown in FIG. 2, mode numerals layer 140 may additionally comprise mode label 161 ("Lydian"), mode label 162 ("Ionian"), mode label 163 ("Mixolydian"), mode label 164 ("Dorian"), mode label 165 ("Aeolian"), mode label 166 ("Phrygian"), and mode label 167 ("Locrian").

Except for symbols 145a-1, 150a-1, and 155a-1, mode numerals layer 140 may be transparent so that, when overlaid over chord array layer 110, chord representations 115a-1, 120a-1, and 125a-l are visible through mode numerals layer 140.

Symbols 145a-1, 150a-1, and 155a-1 are spatially located on mode numerals layer 140 so that, when overlaid over chord array layer 110 such that both mode numerals layer 140 and chord array layer 110 are aligned on the same virtual axis 105, each of symbols 145a-1, 150a-1, and 155a-1 is spatially proximate to, and thereby having a visual association with, one of the chord symbols 115a-1, 120a-1, and 125a-1 in chord array layer 110. More specifically, chord layer inner ring symbols 115a-l are associated with mode numerals layer inner ring symbols 145a-1; chord layer middle ring symbols 120a-l are associated with mode numerals layer middle ring symbols 150a-1; and chord layer outer ring symbols 125a-l are associated with mode numerals layer outer ring symbols 155a-1.

Chord array layer 110 and mode numerals layer 140 are spatially organized so that when mode numerals layer 140 is rotated around axis 105 relative to chord array layer 110, (i) the spatial associations between symbols 115a-1 in inner ring 115 of chord array layer 110 and symbols 145a-1 in inner ring 145 of mode numerals layer 140 change; (ii) the spatial associations between symbols 120a-1 in middle ring 120 of chord array layer 110 and symbols 150a-1 in middle ring 150 of mode numerals layer 140 change; and (iii) the spatial associations between symbols 125a-l in outer ring 125 of chord array layer 110 and symbols 155a-1 in outer ring 155 of mode numerals layer 140 change.

FIGS. 6-12 show mode numerals layer 140 overlaid over chord array layer 110 in seven of the rotational configurations in which mode numerals layer 140 and chord array layer 110 may be rotated relative to each other.

Symbols 145a-1, 150a-1, and 155a-1 in mode numerals layer 140 may be numerals that identify chord roles or functions within a given key and mode, and thereby aid in borrowing chords and modal mixture. For example, as shown in FIGS. 6-12, the seven C parallel modes are permutations of other adjacent key groupings within the Chord Map, and these same relationships are present in all keys and modes. This is what facilitates and explains the use of borrowed chords-because a user may simply "reach over and borrow" a harmonically compatible chord from a neighboring area within the circle of fifths. Specifically, for this example of C parallel modes: C Lydian=G Ionian . . . C Ionian=C Ionian . . . C Mixolydian=F Ionian . . . C Dorian=Bb Ionian . . . C Aeolian=Eb Ionian . . . C Phrygian=Ab Ionian . . . C Locrian=Db Ionian. Using traditional letter names and numerals alone, these relationships are obscured by otherwise non-intuitive alpha-numeric characters. The colors and shapes, however, and their respective arrangement in relation to the Chord Map layers, highlight the underlying geometric symmetry between all of these patterns, greatly facilitating the user's understanding and musical ability.

As noted herein above, other symbols could be used to represent various chord types (e.g., a "+" symbol to denote an augmented chord). Hypothetically, one could also create different numeral overlays with numbers representing seventh and extended chords (e.g., V7 or ii9), but that is getting fairly obscure. The design described here—with three concentric chord rings (major, minor, and diminished) with numerals representing basic triads (non-seventh or-extended chords)—is meant to assist the large majority of musicians, and account for most songs in popular music, which are predominantly written using one of the seven main modes.

Grouping Layer

Figure 3:
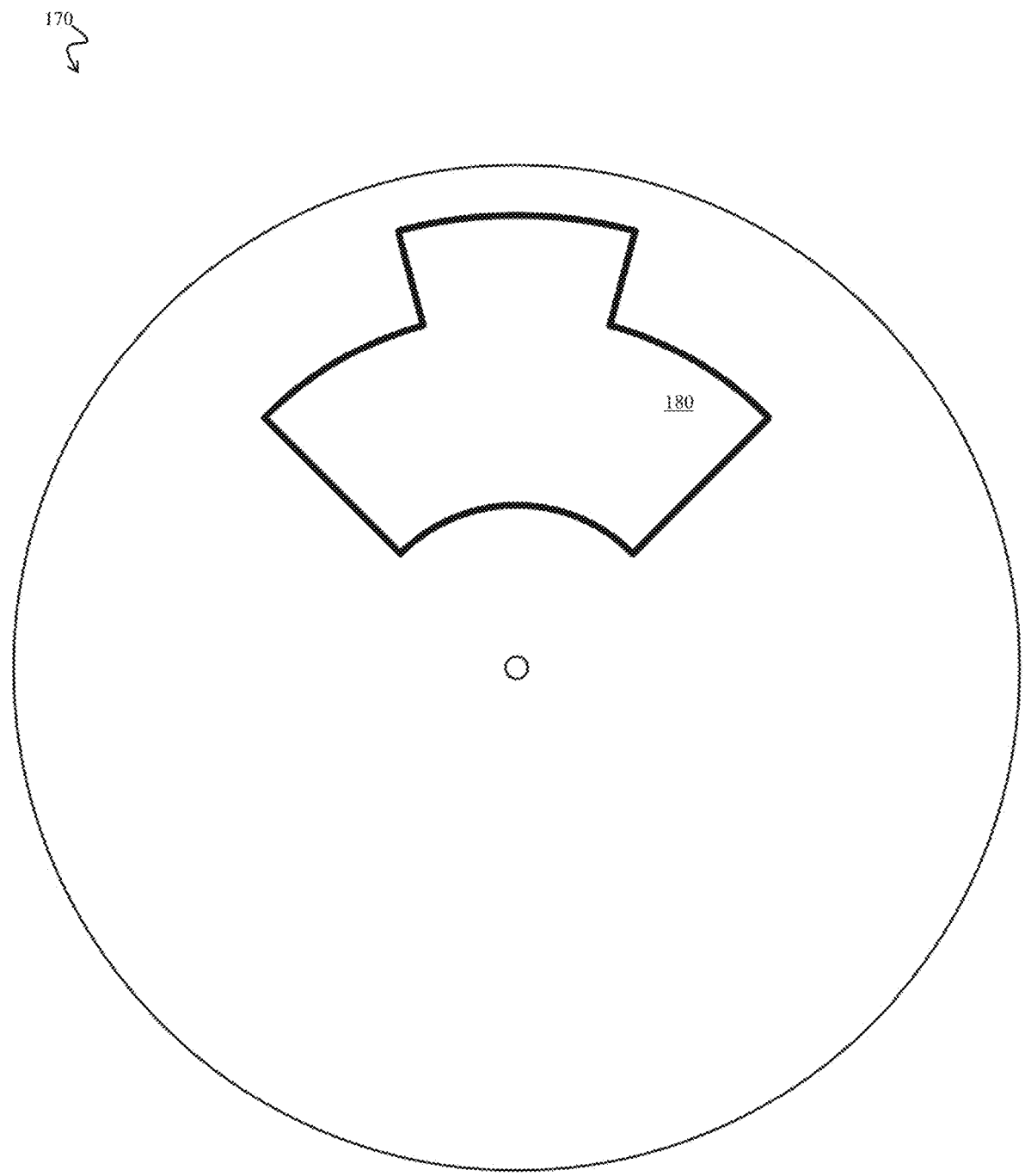
FIG. 3 shows an exemplary grouping layer.

As shown in FIG. 3, Grouping layer 170 comprises an indication of grouping 180 for spatially adjacent chord representations from 115a-1, 120a-1, and 125a-1. Grouping layer 170 may be transparent except for visual grouping indication 180.

Figure 10:
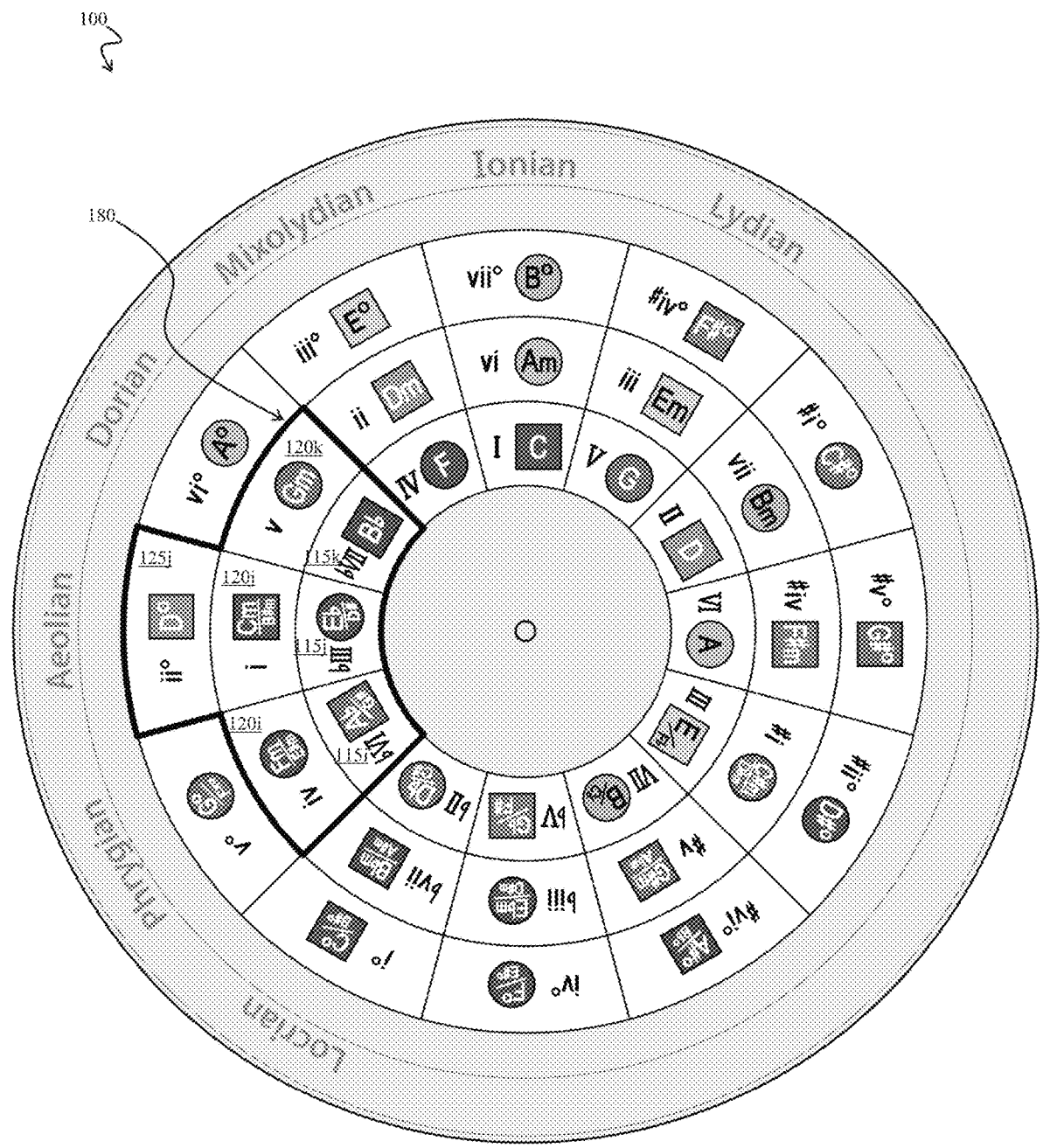
FIG. 10 shows an exemplary Chord Map configuration.
Figure 11:
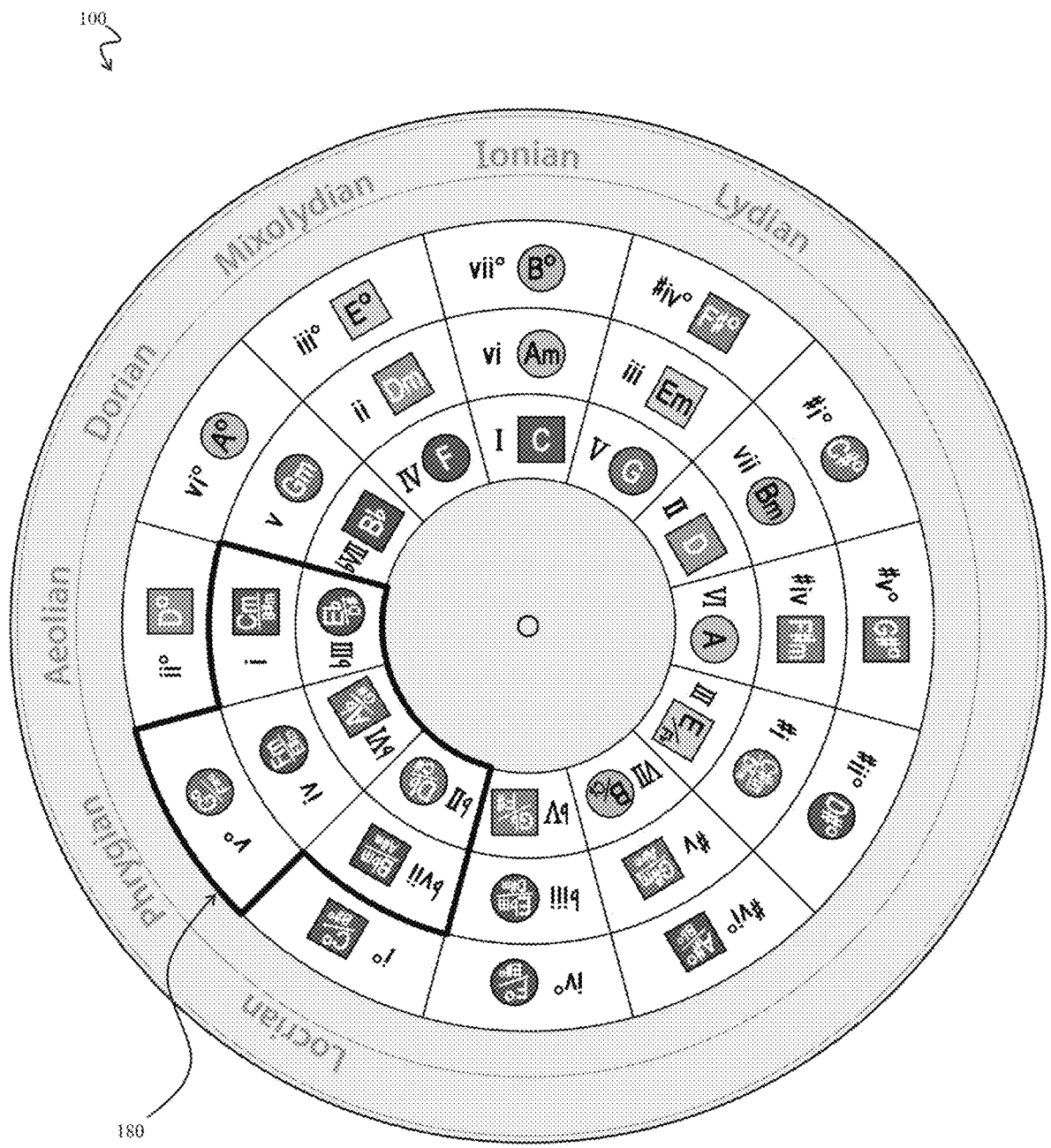
FIG. 11 shows an exemplary Chord Map configuration.
Figure 12:
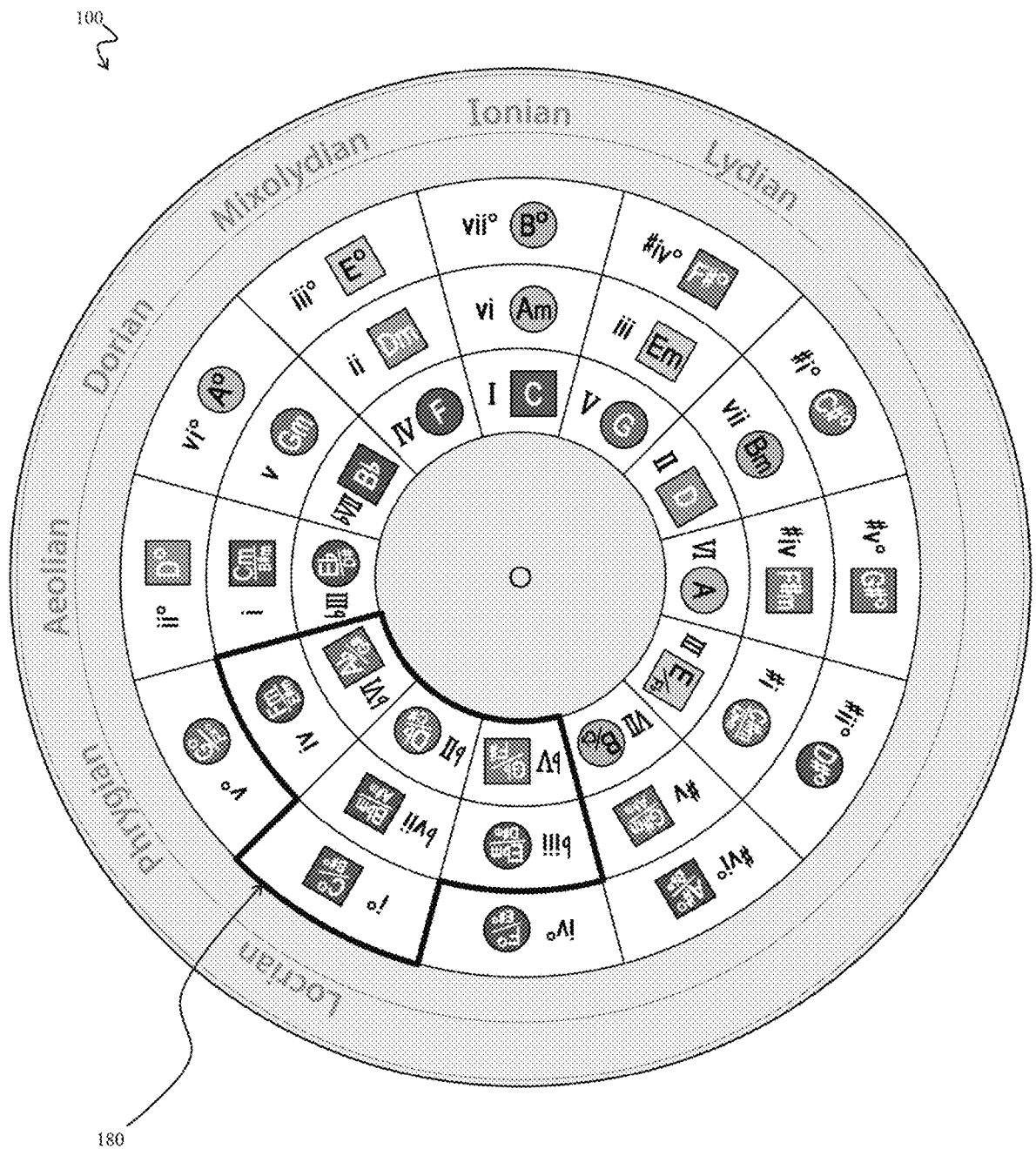
FIG. 12 shows an exemplary Chord Map configuration.

As shown in FIG. 3, visual grouping indication 180 may be an outline that, when overlaid over chord array layer 110 and mode numerals layer 140, associates/groups multiple chords from 115a-1, 120a-1, and 125a-1 and/or associated symbols 145a-1, 150a-1, and 155a-1. This grouping/association highlights and/or identifies adjacent chords within a given key and mode. For example, as shown in FIG. 6, chord grouping indication 180 groups/associates chords C major, D minor, E minor, F major, G major, A minor, and B diminished, which, as indicated in conjunction with the mode numerals layer 140, is shown to be C Ionian (mode label 162). The grouping indication 180 shows that these seven chords are compatible (i.e., harmonically related and often combined in various chord progressions) because they are derived from the same underlying scale/mode, which is the C major scale (a.k.a, C Ionian) in this example. When the grouping indication 180 is rotated counterclockwise 90-degrees, as shown in FIG. 10, the associated/grouped chords are C minor (120j), D diminished (125j), Eb major (115j), F minor (120i), G minor (120k), Ab major (115i), and Bb major (115k). In conjunction with the mode numerals layer 140, this grouping is shown to be C Aeolian (a.k.a., the key of C minor), as indicated by mode label 165.

Figure 13:
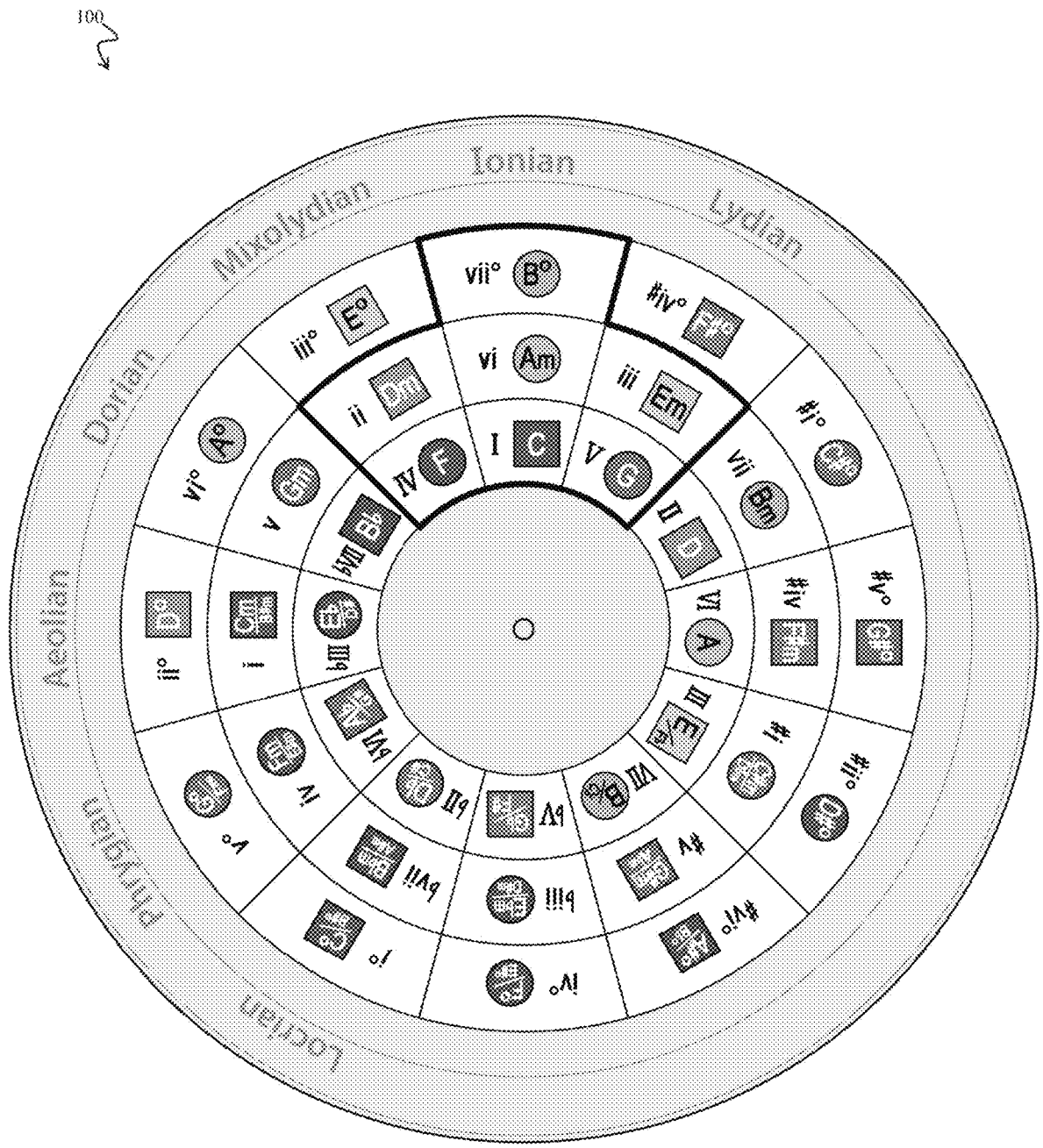
FIG. 13 shows an exemplary Chord Map configuration.
Figure 14:
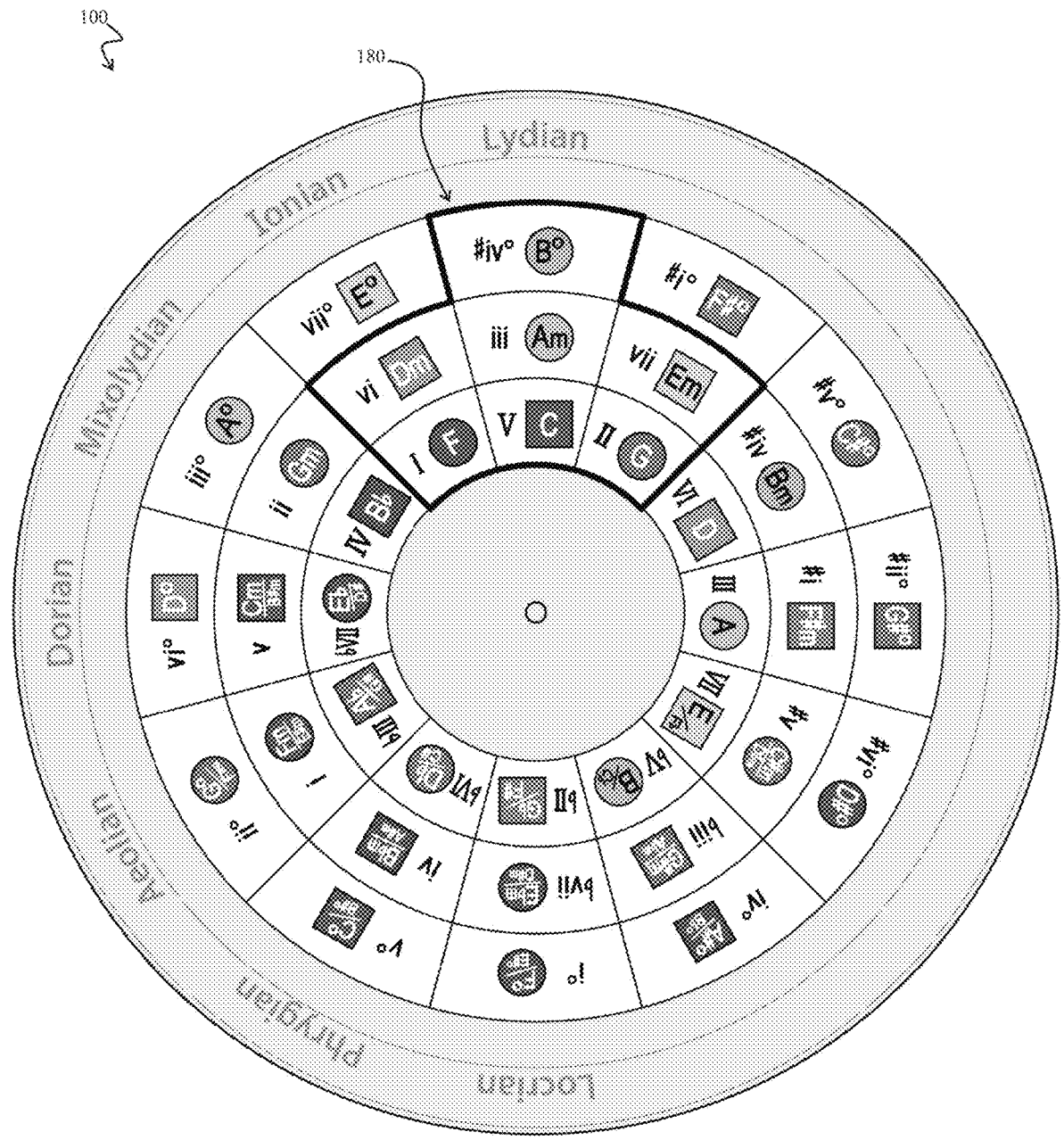
FIG. 14 shows an exemplary Chord Map configuration.
Figure 15:
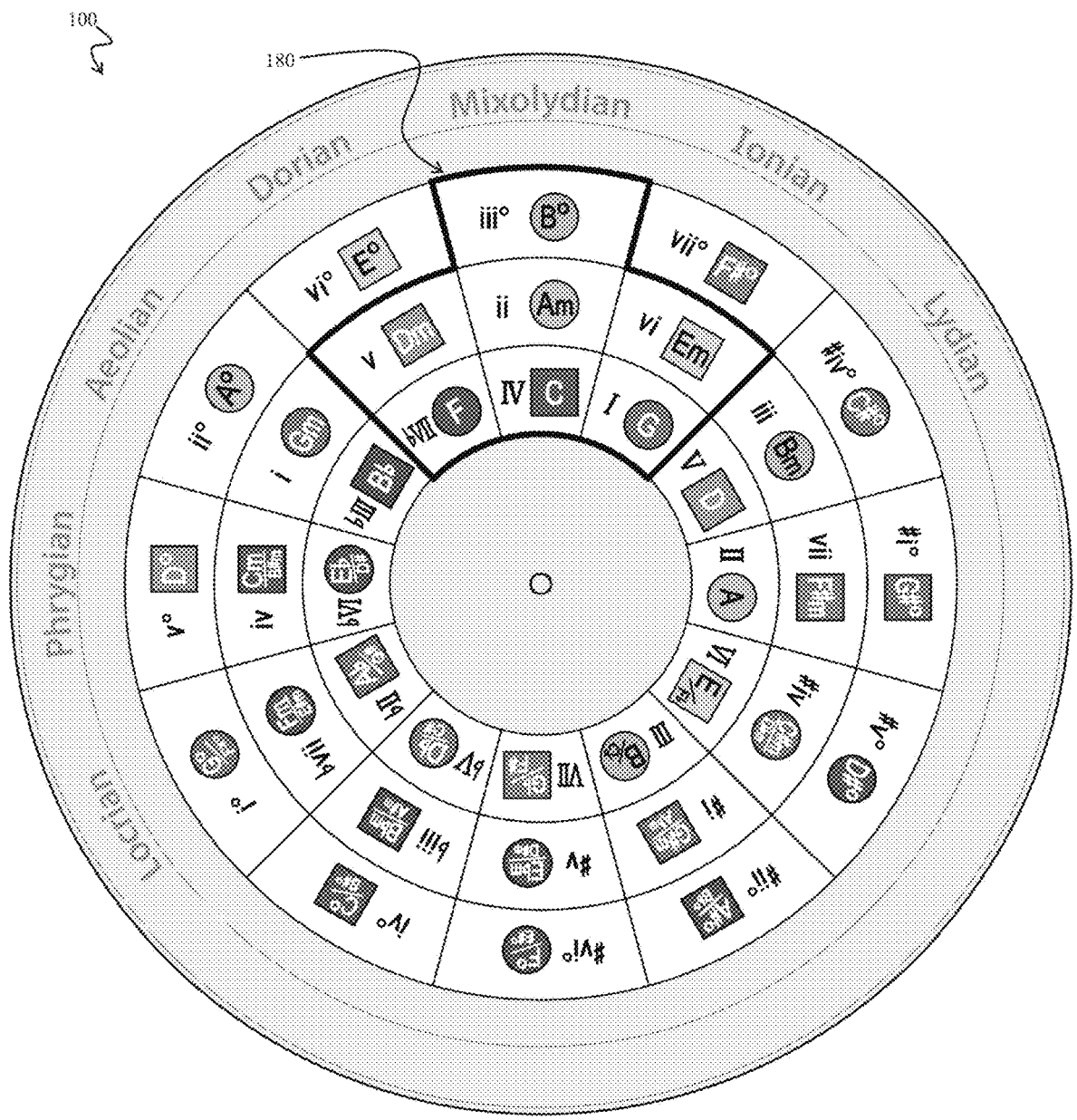
FIG. 15 shows an exemplary Chord Map configuration.
Figure 17:
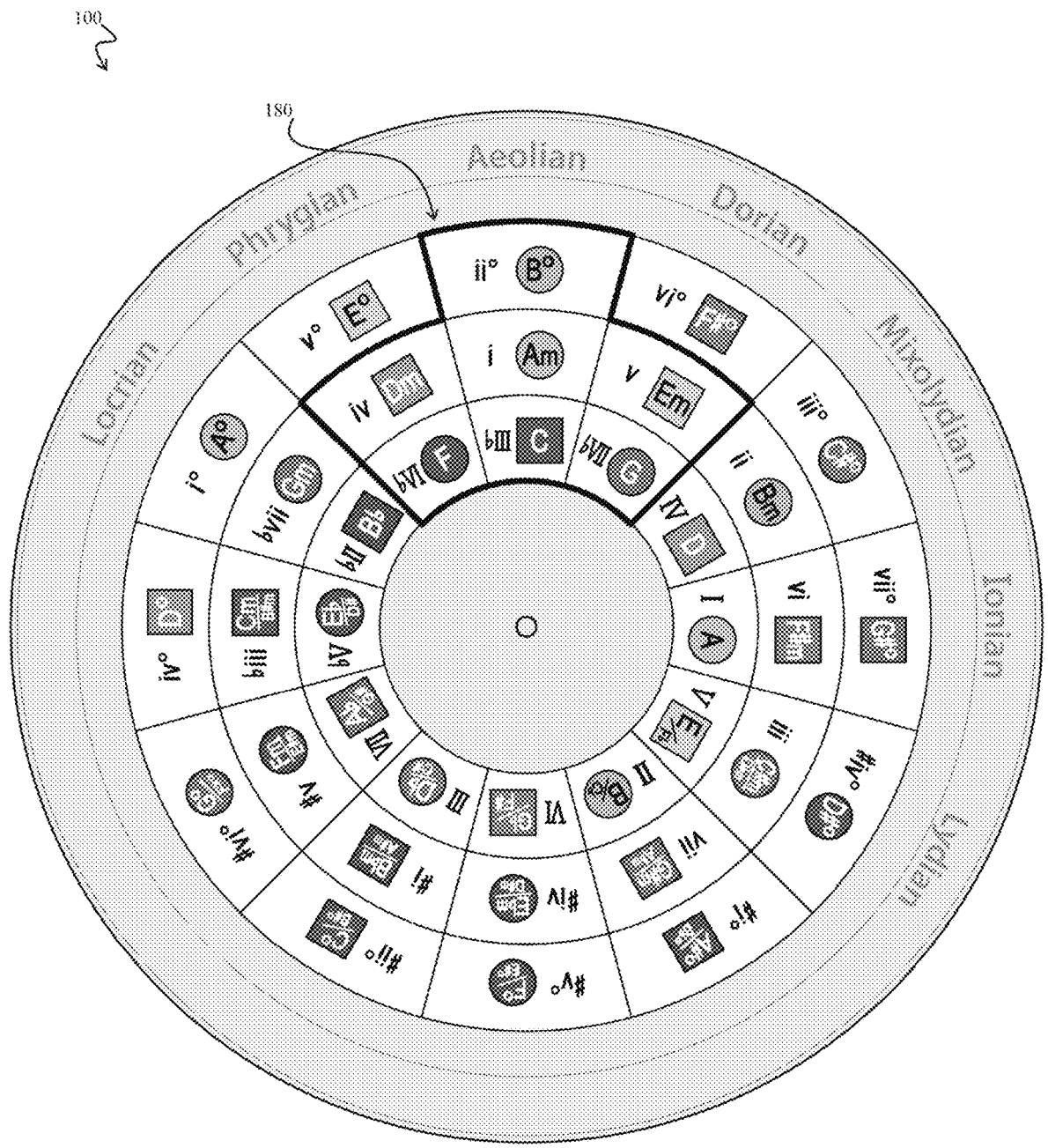
FIG. 17 shows an exemplary Chord Map configuration.
Figure 18:
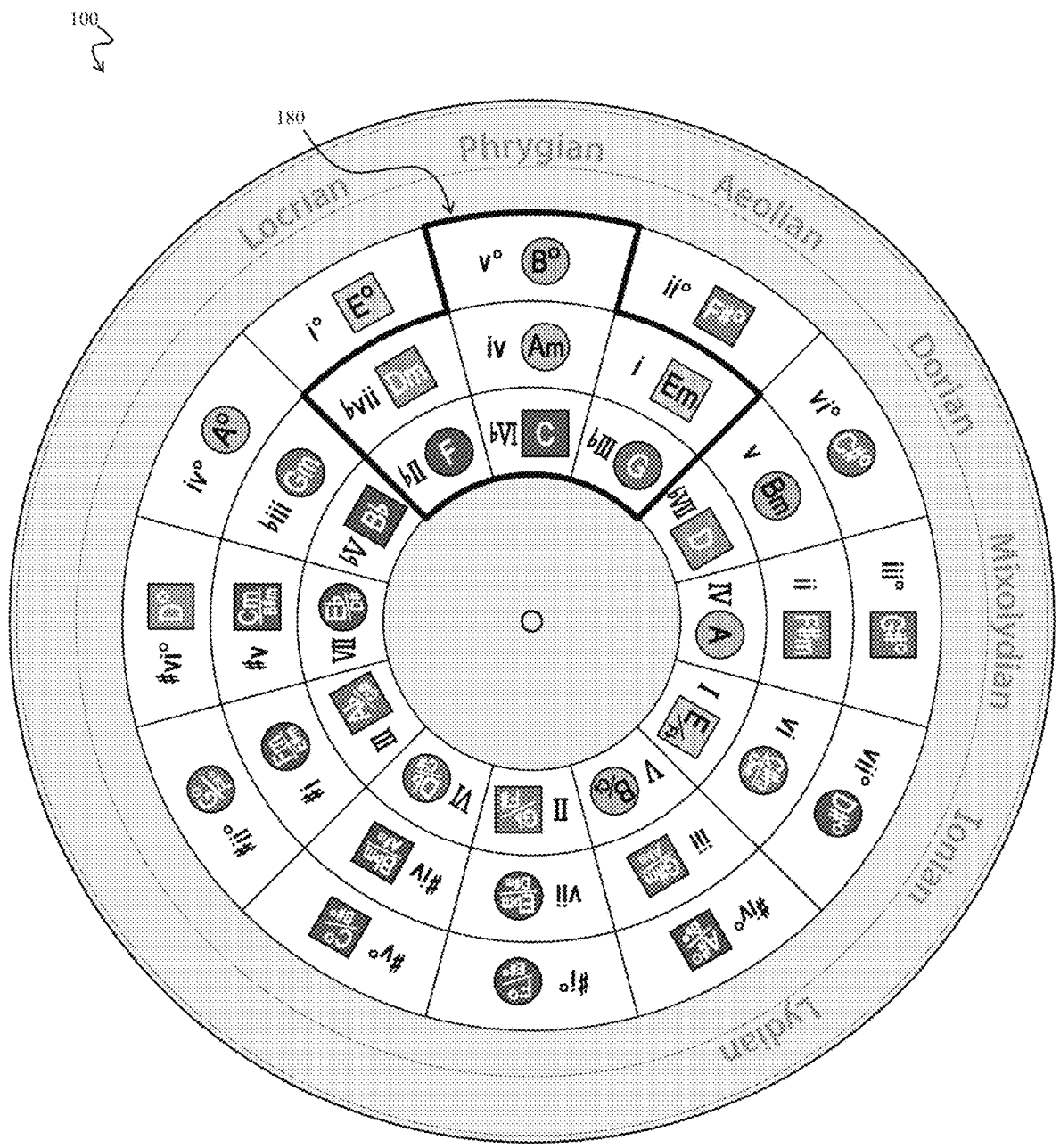
FIG. 18 shows an exemplary Chord Map configuration.
Figure 19:
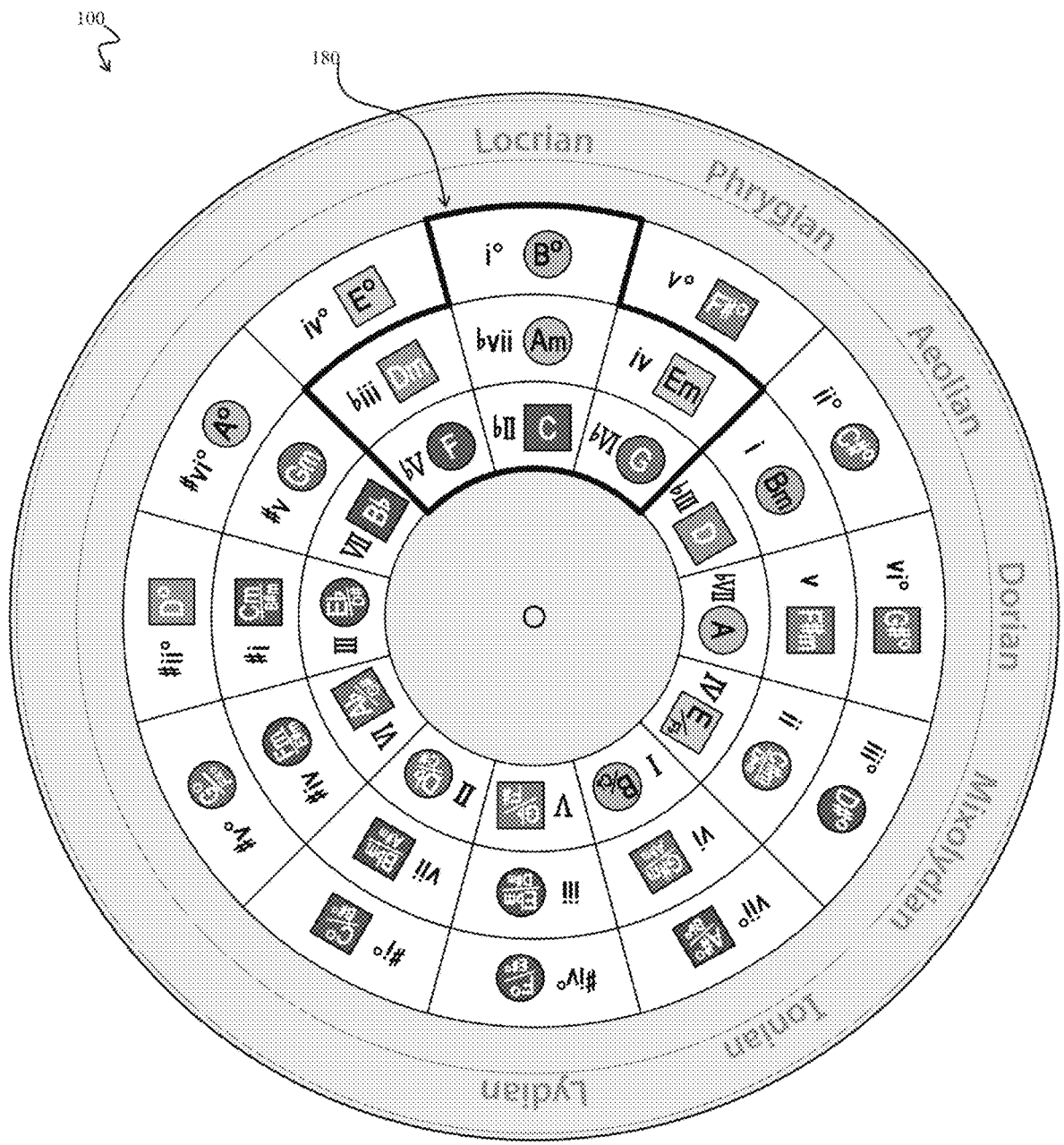
FIG. 19 shows an exemplary Chord Map configuration.

Likewise, by rotating the grouping indication 180 to different positions, the chords of various modes are visually highlighted for analysis. Conversely, when the grouping indication 180 remains stationary in relation to the mode numerals layer 140, the user can easily observe how a given chord group goes by different names, with each respective chord assigned a different role (or harmonic function) based on the mode. For example, chords C major, D minor, E minor, F major, G major, A minor, and B diminished are included in the F Lydian mode (FIG. 14), as well as C Ionian (FIG. 13), G Mixolydian (FIG. 15), D Dorian (FIG. 16), A Aeolian (FIG. 17), E Phrygian (FIG. 18), and B Locrian (FIG. 19). As a result, the connections between various relative modes is clear, aiding an understanding of chordal relations in the composition of music.

This spatial relationship reflected by grouping indication 180 is significant because it highlights which chords are most compatible in songwriting based on their construction within a given key and mode. In conjunction with the mode numerals layer 140, the grouping indication 180 also clarifies the symmetrical relationships between both parallel and relative modes within any key. For example, as described herein below, when the mode numerals layer 140 remains stationary, parallel modes of a given key are highlighted by rotating the grouping indication 180 in a counterclockwise direction. And in reverse, when the grouping indication 180 remains stationary, relative modes of a given key are highlighted by rotating the mode numerals layer 140 in a clockwise direction. The arrangement of elements on Chord Map 100, with their ability to move independently of one another, provides for such insights between all modes in every key.

Grouping layer 170 may be rotatable around axis 105 independent of chord array layer 110 and mode numerals layer 140.

The shape of grouping indication 180 is significant because it highlights the chords that are formed within a given key and mode. These chords are built using what are called "tertian" intervals (i.e., intervals of major-thirds, and minor-thirds-which are all formed by combining every other note of an underlying scale or mode. The whole-step and half-step intervals that form the scale/mode also result in harmonically pleasing tertian intervals that separate every other note in that pattern, resulting in distinct harmonies of major, minor, and diminished chords that comprise a "set" that can be used to compose chord progressions and songs. Grouping indication 180 surrounds/groups/associates all chords that form a set within a given key/mode.

It is possible to have a grouping that includes non-adjacent chords. For instance, the Harmonic Minor scale also includes augmented chords (due to the tertian intervals that result from its underlying scale pattern). The chord "set" for this pattern includes non-adjacent chords in the circle of fifths. Also, using Chord Map 100 as shown in FIGS. 1-19, a user could mark various "borrowed" chords using, e.g., a dry-erase marker, to highlight chords outside of a given "set" that are included in a progression. For example, a song mostly in C Ionian would include (all, or some, of) chords C major, D minor, E minor, F major, G major, A minor, and B diminished. To add more musical variety, a user might also "borrow" the Bb major chord from the C Mixolydian mode (as is often done in blues and rock music). To indicate this, the user might add/draw a line around the Bb major chord to indicate that it is included in the progression despite not being part of the primary mode/chord group set.

In some embodiments, grouping layer 170 could be used without mode numerals layer 140, but this may result in loss of a significant amount of information. This is because the user could see which chords form a compatible "set," but the role/function of each chord within a given mode would not be readily apparent. Without the mode numerals layer, a user is unable to easily analyze the relationships between various modes.

In other embodiments, the ordering in which layers 110, 140, and 170 are "stacked," and the associated transparency, e.g., which layer is on bottom, which layer is in the middle, and which layer is on top—and which layers must therefore be transparent—could be changed without materially affecting the functionality of the design described herein.

The Chord Map described herein may be implemented in a physical manner, e.g., using paper, plastic, etc., and/or virtually/electronically, e.g., on an app, website, or other computer implementation.

The invention claimed is:

1. An apparatus, comprising:
a chord array layer comprising a major chords ring, a minor chords ring, and a diminished chords ring, wherein:
the major chords ring comprises twelve major chords;
the minor chords ring comprises twelve minor chords;
the diminished chords ring comprises twelve diminished chords; and
the major chords ring, the minor chords ring, and the diminished chords ring are concentric to each other around an axis; and
a mode numerals layer comprising a major chords numerals ring, a minor chords numerals ring, and a diminished chords numerals ring, wherein:
the major chords numerals ring comprises twelve major chord symbols;
the minor chords numerals ring comprises twelve minor chord symbols;
the diminished chords numerals ring comprises twelve diminished chord symbols;
the major chords numerals ring, the minor chords numerals ring, and the diminished chords numerals ring are concentric to each other around the axis;
wherein:
the axis is virtual, actual, or a combination of virtual and actual;
the mode numerals layer is rotatable relative to the chord array layer around the axis;
the chord array layer and the mode numerals layer are configured to visually present spatial associations between: (i) each of the twelve major chords in the major chords ring and each of the twelve major chord symbols in the major chords numerals ring; (ii) each of the twelve minor chords in the minor chords ring and each of the twelve minor chord symbols in the minor chords numerals ring; and (iii) each of the twelve diminished chords in the diminished chords ring and each of the twelve diminished chord symbols in the diminished chords numerals ring; and
the chord array layer and the mode numerals layer are configured to change the spatial associations based on the rotation of the mode numerals layer relative to the chord array layer.

2. The apparatus of claim 1, wherein:
each of the twelve major chord symbols is a major chord numeral;
each of the twelve minor chord symbols is a minor chord numeral; and
each of the twelve diminished chord symbols is a diminished chord numeral.

3. The apparatus of claim 1, wherein:
the mode numerals layer further comprises a mode labels ring;
the mode labels ring is concentric around the axis to each of the major chords numerals ring, the minor chords numerals ring, and the diminished chords numerals ring; and
the mode labels ring comprises at least one mode label.

4. The apparatus of claim 3, wherein the mode labels ring comprises seven mode labels.

5. The apparatus of claim 4, wherein the mode labels are "Locrian," "Phrygian," "Aeolian," "Dorian," "Mixolydian," "Ionian," and "Lydian".

6. The apparatus of claim 1, further comprising a grouping layer, wherein:
the grouping layer is concentric around the axis to the major chords ring, the minor chords ring, the diminished chords ring, the major chords numerals ring, the minor chords numerals ring, and the diminished chords numerals ring;
the grouping layer presents a visual grouping of three major chords from the major chords ring, three minor chords from the minor chords ring, and one diminished chord from the diminished chords ring;
the three major chords, three minor chords, and one diminished chord associated with the visual grouping changes as the grouping layer is rotated relative to the chord array layer.

7. The apparatus of claim 6, wherein the grouping layer is rotatable around the axis relative to the mode numerals layer.

8. The apparatus of claim 6, wherein the grouping layer is rotatable around the axis relative to the chord array layer.

9. The apparatus of claim 6, wherein each of the chord array layer, the mode numerals layer, and the grouping layer is independently rotatable around the axis relative to each other.

10. The apparatus of claim 1, wherein:
the major chords ring is inside of the minor chords ring; and
the minor chords ring is inside of the diminished chords ring.

11. The apparatus of claim 1, wherein at least two of the chords in the twelve major chords, twelve minor chords, and twelve diminished chords are color-coded to suggest chord roots within the circle of fifths.

12. The apparatus of claim 1, wherein at least two of the chords in the twelve major chords, twelve minor chords, and twelve diminished chords are shape-coded to suggest interval distance between notes.

13. An apparatus, comprising:
a chord array layer comprising a major chords ring and a minor chords ring, wherein:
the major chords ring comprises twelve major chords;
the minor chords ring comprises twelve minor chords; and
the major chords ring and the minor chords ring are concentric to each other around an axis; and
a mode numerals layer comprising a major chords numerals ring and a minor chords numerals ring, wherein:
the major chords numerals ring comprises twelve mode numerals;
the minor chords numerals ring comprises twelve mode numerals;
the major chords numerals ring and the minor chords numerals ring are concentric to each other around the axis;
wherein:
the axis is virtual, actual, or a combination of virtual and actual;
the mode numerals layer is rotatable relative to the chord array layer around the axis;
the chord array layer and the mode numerals layer are configured to visually present spatial associations between: (i) each of the twelve major chords in the major chords ring and each of the twelve numerals in the major chords numerals ring and (ii) each of the twelve minor chords in the minor chords ring and each of the twelve numerals in the minor chords numerals ring; and the chord array layer and the mode numerals layer are configured to change the spatial associations based on the rotation of the mode numerals layer relative to the chord array layer.

14. The apparatus of claim 13, wherein:

the mode numerals layer further comprises a mode labels ring;

the mode labels ring is concentric around the axis to each of the major chords numerals ring and the minor chords numerals ring; and the mode labels ring comprises at least one mode label.

15. The apparatus of claim 14, wherein the mode labels ring comprises seven mode labels:

"Locrian," "Phrygian," "Aeolian," "Dorian," "Mixolydian," "Ionian," and "Lydian".

16. The apparatus of claim 13, further comprising a grouping layer, wherein:

the grouping layer is concentric around the axis to the major chords ring, the minor chords ring, the major chords numerals ring, and the minor chords numerals ring;

the grouping layer presents a visual grouping of three major chords from the major chords ring and three minor chords from the minor chords ring;

the grouping layer is rotatable around the axis relative to the chord array layer;

the three major chords and the three minor chords associated with the visual grouping changes as the grouping layer is rotated relative to the chord array layer.

17. The apparatus of claim 16, wherein each of the chord array layer, the mode numerals layer, and the grouping layer is independently rotatable around the axis relative to each other.

18. The apparatus of claim 13, wherein the major chords ring is inside of the minor chords ring.

19. The apparatus of claim 13, wherein at least two of the chords in the twelve major chords and the twelve minor chords are color-coded to suggest chord roots within the circle of fifths.

20. The apparatus of claim 13, wherein at least two of the chords in the twelve major chords and the twelve minor chords are shape-coded to suggest interval distance between notes.

* * * * *